US008611028B2

(12) United States Patent
Hirabayashi et al.

(10) Patent No.: US 8,611,028 B2
(45) Date of Patent: Dec. 17, 2013

(54) LENS BARREL AND IMAGING DEVICE

(75) Inventors: Koichiro Hirabayashi, Osaka (JP); Kazuo Shibukawa, Osaka (JP); Fumio Shinano, Osaka (JP); Shinichi Iwasaki, Osaka (JP); Masahiro Nakano, Yamagata (JP); Akio Konishi, Hyogo (JP); Takumi Kuwahara, Nara (JP)

(73) Assignee: Panasonic Corporation, Osaka (JP)

( * ) Notice: Subject to any disclaimer, the term of this patent is extended or adjusted under 35 U.S.C. 154(b) by 173 days.

(21) Appl. No.: 13/386,134

(22) PCT Filed: Jul. 23, 2010

(86) PCT No.: PCT/JP2010/004715
§ 371 (c)(1),
(2), (4) Date: Jan. 27, 2012

(87) PCT Pub. No.: WO2011/010470
PCT Pub. Date: Jan. 27, 2011

(65) Prior Publication Data
US 2012/0176691 A1    Jul. 12, 2012

(30) Foreign Application Priority Data

Jul. 23, 2009 (JP) ................................. 2009-171709
Jan. 15, 2010 (JP) ................................. 2010-006595
Jan. 15, 2010 (JP) ................................. 2010-006597

(51) Int. Cl.
*G02B 7/02* (2006.01)
(52) U.S. Cl.
USPC ............................ 359/819; 359/811; 359/813
(58) Field of Classification Search
USPC ......................................... 359/811, 813, 819
See application file for complete search history.

(56) References Cited

U.S. PATENT DOCUMENTS 6,292,221 B1* 9/2001 Lichtman ...................... 348/345
2006/0269267 A1* 11/2006 Hayashi et al. ................. 396/85

FOREIGN PATENT DOCUMENTS

| JP | 04-141610 A | 5/1992 |
|---|---|---|
| JP | 2002-162555 A | 6/2002 |
| JP | 2007-232889 A | 9/2007 |
| JP | 2008-216927 A | 9/2008 |
| JP | 2008-292686 A | 12/2008 |
| JP | 2009-069269 A | 4/2009 |

OTHER PUBLICATIONS

International Search Report for corresponding International Application No. PCT/JP2010/004715 mailed Oct. 26, 2010.
Form PCT/ISA/237 for corresponding International Application No. PCT/JP2010/004715 dated Oct. 26, 2010 with Partial English translation.

* cited by examiner

*Primary Examiner* — James Jones
(74) *Attorney, Agent, or Firm* — Renner, Otto, Boisselle & Sklar, LLP

(57) ABSTRACT

A lens barrel 111 according to the present invention includes: a lens group 220 which moves along an optical axis direction 300; and a lens holding frame 224 holding a lens group 220. A guide hole 406 is provided in the lens holding frame 224, the guide hole 406 being penetrated by a main shaft 440 having a circular cross section. A cross section of the guide hole 406 taken orthogonal to a longitudinal direction of the main shaft 440 includes at least two linear portions 406a, and the main shaft 440 is in contact with the two linear portions 406a.

15 Claims, 12 Drawing Sheets (a)

(b)

LENS BARREL AND IMAGING DEVICE

TECHNICAL FIELD

The present invention relates to a lens barrel and an imaging apparatus, and in particular to a moving mechanism for a lens frame which is disposed in the inside of a lens barrel.

BACKGROUND ART

In recent years, imaging apparatuses are in wide use which perform imaging with incident light from a lens by using a solid imaging device such as a CCD (Charge Coupled Device) or a CMOS (Complimente Metal Oxide Semiconductor), and allow the image to be taken out after conversion into an electrical signal. Moreover, due to requirements for downsizing and higher performances of portable devices such as exchangeable lens type DSCs (Digital Still Cameras), fixed-lens type DSCs, and camcorders, the lens barrel as a main component part of an imaging apparatus is facing needs of further downsizing, weight reduction, and thinness. Generally speaking, a lens barrel is composed of a plurality of lens groups, such that each functional unit, e.g., a zooming function or a focusing function, corresponds to one group.

In such a lens barrel, a zoom lens group and a focusing lens group are provided so as to be capable of moving along the direction of an optical axis. For example, the zoom lens group is held in a lens holding frame. Furthermore, a guide shaft for guiding the lens holding frame along the optical axis direction is provided, the guide shaft being securely supported by the lens barrel. Furthermore, an actuator, e.g., a motor, for moving the lens holding frame is provided in the imaging apparatus. Light from a subject travels through the zoom lens group, whereby an optical image of the subject is converged onto an imaging device.

As a moving mechanism for the lens holding frame, a lead screw and a rack gear are used, for example. Specifically, a rack gear which is fixed to the lens holding frame is energized against a lead screw by a rack spring or the like. As a result, the rack gear meshes with the lead screw. Furthermore, by rotating the lead screw with a motor, the rack gear is moved. In synchronization with the move of the rack gear, the lens holding frame moves.

For example, in a lens barrel of Patent Document 1, two lead screws, respectively for a zoom lens holding frame and a focusing lens holding frame, are rotated by a single motor, and a rack gear meshing with each lead screw is separated from the lead screw with a predetermined timing to disengage meshing.

In a lens barrel of Patent Document 2, one lead screw and a switching plate are provided, and either one of the zoom lens holding frame and the focusing lens holding frame is selectively meshed with the lead screw, and moved along the optical axis direction.

Patent Document 3 discloses, with the purpose of stabilizing the behavior of a lens holding frame when moving along the axial direction, providing an energizing member in between a guide shaft and a lens holding member.

Citation List
Patent Literature

[Patent Document 1] Japanese Laid-Open Patent Publication No. 2002-162555

[Patent Document 2] Japanese Laid-Open Patent Publication No. 2009-69269

[Patent Document 3] Japanese Laid-Open Patent Publication No. 2007-232889

SUMMARY OF INVENTION

Technical Problem

In conventional lens barrels, a circular guide hole or a guide groove is provided in the lens holding frame. Furthermore, as a guide shaft penetrates through the guide hole, or a guide shaft is fitted in the guide groove, the lens holding frame is enabled to move along the optical axis direction.

However, conventional lens barrels have a problem in that some play will emerge between the guide hole or the guide groove and the guide shaft, thus deteriorating the optical performance. This is due to the fact that the guide hole has a circular shape; if the finishing precision of the guide hole is insufficient, portions with a large clearance may emerge between the main shaft and the guide hole. Although Patent Document 3 does disclose a mechanism for stabilizing such behavior, there is a problem in that providing an energizing member between the guide shaft and the lens holding frame results in a complicated structure and an increased cost. There is also a problem of difficulty of downsizing.

A rack gear has a plurality of teeth, such that all of the teeth are meshed with a lead screw. This induces a problem in that a loading point of the rack gear onto the lead screw fluctuates, thus making it difficult to improve the moving precision of the lens holding frame.

The present invention, which has been made in order to solve the aforementioned problems, provides a lens barrel which is capable of reducing deteriorations in the optical performance at low cost, by decreasing the play of a lens holding frame which is guided by a guide shaft so as to be capable of moving along an optical axis direction. Moreover, the present invention provides a lens barrel in which a loading point of a rack gear onto a lead screw is kept stable, such that the lens holding frame has an improved moving precision and shatter strength. There is also provided an imaging apparatus, which includes such a lens barrel for achieving downsizing and cost reduction.

Solution to Problem

A lens barrel according to the present invention comprises: a lens group which moves along an optical axis direction; and a lens holding frame holding the lens group, wherein, a guide hole is provided in the lens holding frame, the guide hole being penetrated by a main shaft having a circular cross section; a cross section of the guide hole taken orthogonal to a longitudinal direction of the main shaft includes at least two linear portions; and the main shaft is in contact with the two linear portions.

In one embodiment, a corner portion of the guide hole corresponding to the two linear portions is oriented in a direction of a force acting on the guide hole.

In one embodiment, a corner portion of the guide hole corresponding to the two linear portions comprises a curved surface.

In one embodiment, a plurality of said guide holes are formed in the lens holding frame; each of the plurality of guide holes includes at least two linear portions; the two linear portions of each of the plurality of guide holes are in contact with the main shaft; each of the plurality of guide holes includes a corner portion corresponding to the two linear portions; and the respective corner portions of the plurality of guide holes are oriented in mutually different directions.

In one embodiment, two guide holes are formed in the lens holding frame; and the respective corner portions of the two guide holes are oriented in directions which are 45° apart.

In one embodiment, the cross section of the guide hole is a triangle or a rectangle.

One embodiment comprises: a rack gear provided on the lens holding frame for being moved along the longitudinal direction of the main shaft by a rotation of a lead screw; and a rack spring provided on the lens holding frame for energizing the rack gear against the lead screw, wherein, a first guide hole and a second guide hole are provided in the lens holding frame along the longitudinal direction of the main shaft, the first guide hole and the second guide hole being penetrated by the main shaft; a third guide hole is formed in the lens holding frame, the third guide hole being penetrated by a sub-shaft; and in a cross section taken orthogonal to the longitudinal direction of the main shaft, a point of abutment between the rack gear and the lead screw, the main shaft, and the sub-shaft are disposed in this order.

In one embodiment, along a direction which is orthogonal to a direction of a force generated by the rack spring between the rack gear and the lead screw and which is orthogonal to the longitudinal direction of the main shaft, the point of abutment between the rack gear and the lead screw, the main shaft, and the sub-shaft are disposed in this order.

In one embodiment, the two linear portions are provided at positions of the first and second guide holes which receive reaction forces occurring in the lens holding frame when the rack spring energizes the rack gear against the lead screw.

In one embodiment, the two linear portions of the first and second guide holes are energized against the main shaft due to the reaction forces.

In one embodiment, each of the first and second guide holes includes a corner portion corresponding to the two linear portions; and the corner portion of each of the first and second guide holes is oriented in a direction of a force which the rack gear applies to the lead screw.

In one embodiment, the rack gear includes: a first tooth abutting with a groove of the lead screw, and a second tooth adjoining the first tooth and being disposed at an interval which is a groove pitch of the lead screw, such that the second tooth does not abut with the groove of the lead screw.

In one embodiment, where the longitudinal direction of the main shaft defines a height direction, the first tooth is located at a height corresponding to a substantial center between the first guide hole and the second guide hole; and the second tooth is located closer to an end than is the first tooth.

In one embodiment, the rack gear further includes an abutting portion abutting with a crest of at least one ridge of the lead screw.

An imaging apparatus according to the present invention comprises the above lens barrel.

Alternatively, a lens barrel according to the present invention comprises: a lens group which moves along an optical axis direction; a lens holding frame holding the lens group; a rack gear provided in the lens holding frame for being moved along a longitudinal direction of a main shaft by a rotation of a lead screw; and a rack spring provided on the lens holding frame for energizing the rack gear against the lead screw, wherein, a guide hole is provided in the lens holding frame, the guide hole being penetrated by the main shaft; and the rack gear includes a first tooth abutting with a groove of the lead screw, and a second tooth adjoining the first tooth and being disposed at an interval which is a groove pitch of the lead screw, such that the second tooth does not abut with the groove of the lead screw.

Alternatively, an imaging apparatus according to the present invention comprises the above lens barrel.

Advantageous Effects of Invention

According to the present invention, a cross section of a guide hole of a lens holding frame includes at least two linear portions, and a main shaft is in contact with the at least two linear portions. As a result, the play between the guide hole and the guide shaft can be reduced. In other words, the play of the lens holding frame can be reduced, whereby a lens barrel which can reduce deteriorations in the optical performance is provided.

The guide hole of the lens holding frame may have a substantially rectangular shape. When the guide hole has a circular shape, it is necessary to manage finishing precision in terms of roundness. On the other hand, when the guide hole has a substantially rectangular shape, finishing precision can be easily kept under management based on the interval between opposing sides. Therefore, the behavior when the lens holding frame moves along the axial direction becomes stable. Moreover, there is no need to provide an energizing member such as that in the lens barrel described in Patent Document 3. As a result, the behavior when the lens holding frame moves along the main shaft direction can be stabilized with a small size and at low cost.

If the guide hole has a circular shape, the guide shaft and the guide hole will come in contact at a plane, thus resulting in a large sliding resistance relative to the movement of the lens holding frame along the guide shaft direction. On the other hand, when the guide hole has a substantially rectangular shape, the guide shaft and the guide hole will come in contact at points, thus providing an effect in that there is little sliding resistance relative to the movement of the lens holding frame along the guide shaft direction.

Furthermore, it is common practice to apply grease between the guide shaft and the guide hole for lubrication. If the guide hole has a circular shape, the grease will sit on the entire inner surface of the guide hole, thus resulting in a large sliding resistance relative to the movement of the lens holding frame along the guide shaft direction. On the other hand, when the guide hole has a substantially rectangular shape, the four corners of the guide hole serve as grease puddles, so that no more than necessary grease will be supplied to portions where the guide shaft and the guide hole come in contact. This provides an effect in that there is little sliding resistance relative to the movement of the lens holding frame along the guide shaft direction.

Moreover, a rack gear of the lens holding frame may have a first tooth abutting with a groove of a lead screw and a second tooth adjoining the first tooth and being disposed at an interval of a groove pitch of the lead screw, such that the second tooth does not abut with the groove of the lead screw. With this construction, during normal use, the rack gear is loaded with the lead screw only via the first tooth, so that the loading point becomes stable. Moreover, in emergencies such as falling, even if the rack gear slips due to an impact force of falling, the second tooth will mesh with the lead screw, whereby the moving operation of the lens holding frame will be maintained.

According to the present invention, a lens barrel which realizes an improved moving precision of a lens holding frame and an improved shatter strength can be provided.

DESCRIPTION OF EMBODIMENTS (Embodiment 1)
(1. Construction)

A lens unit according to Embodiment 1 of the present invention will be described with reference to the drawings.

Figure 1:
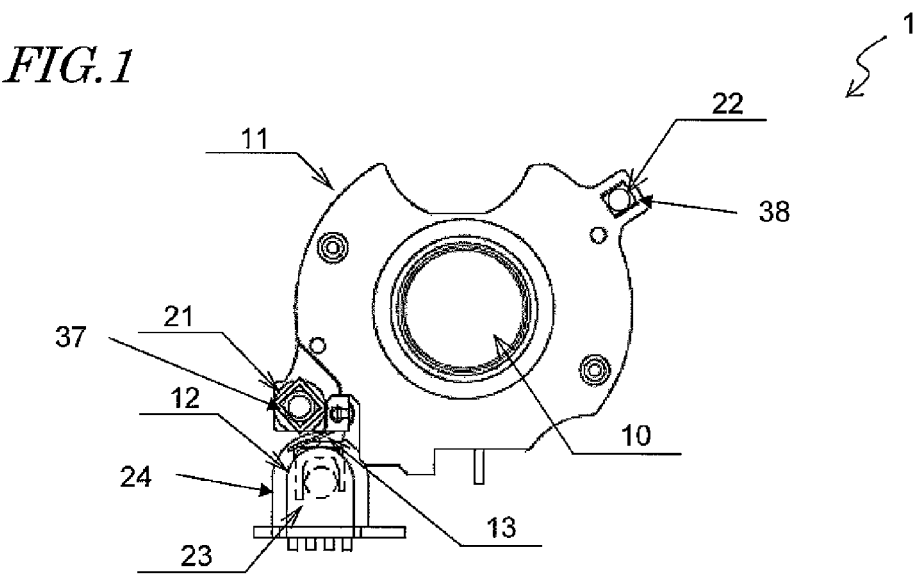
[FIG. 1] A front view showing a lens unit according to an embodiment of the present invention, as viewed along the optical axis.
Figure 2:
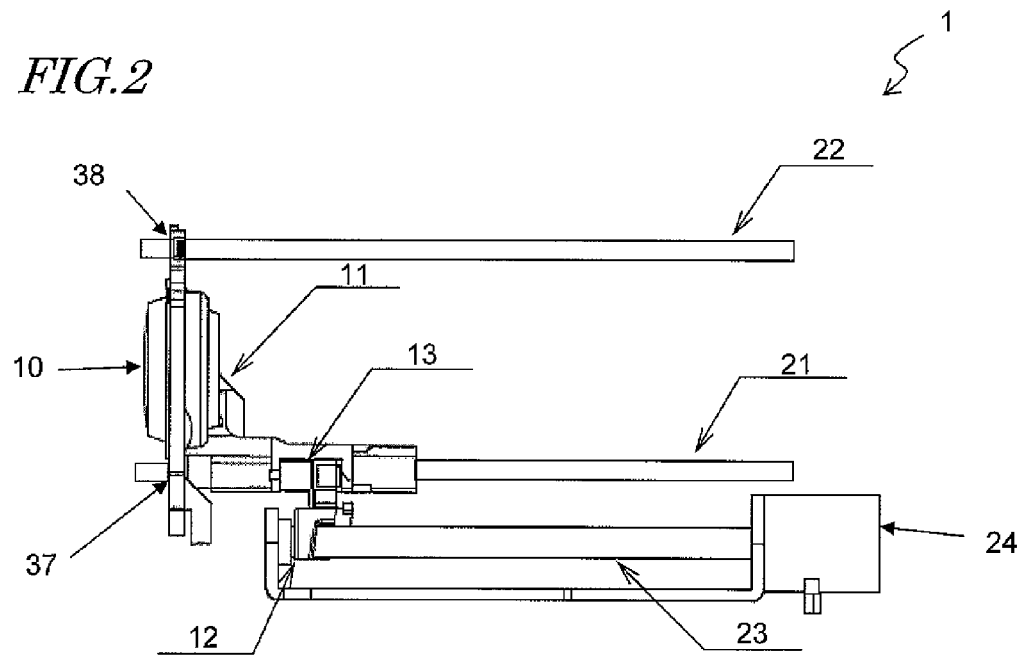
[FIG. 2] A diagram showing a lens holding frame according to an embodiment of the present invention having been moved to the left end in the figure.
Figure 3:
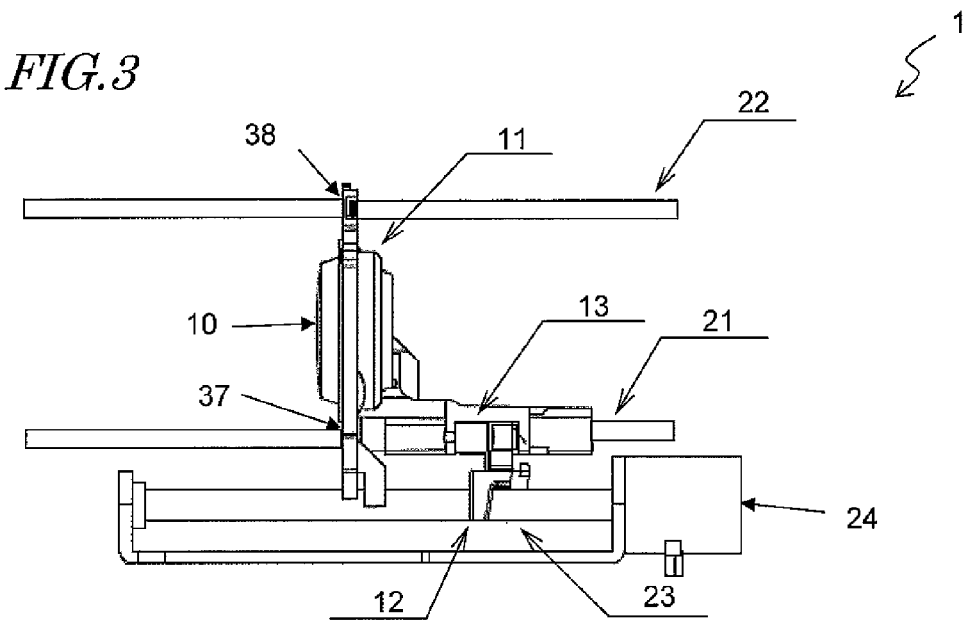
[FIG. 3] A diagram showing a lens holding frame according to an embodiment of the present invention having been moved to the right end in the figure.

FIG. 1 is a front view showing the lens unit 1 according to Embodiment 1 of the present invention as viewed along the optical axis. FIG. 2 and FIG. 3 are side views showing the lens unit 1 in a direction which is perpendicular to the optical axis.

A lens holding frame 11 holds a lens 10. The lens 10 is a lens which is within the lens unit and which needs to move back and forth along the optical axis direction, e.g., a zoom lens or a focusing lens. The lens holding frame 11 is also referred to as a lens moving frame. The lens holding frame 11 includes a main shaft hole 37 through which a main shaft 21 extends and an auxiliary shaft hole 38 through which an auxiliary shaft 22 extends. The main shaft 21 and the auxiliary shaft 22 are also referred to as guide shafts. The main shaft 21 and the auxiliary shaft 22 have circular cross-sectional shapes. The main shaft hole 37 and the auxiliary shaft hole 38 are also referred to as guide holes.

The lens holding frame 11 has a guide portion 13 through which the main shaft 21 extends and on which a rack 12 is formed. The rack 12 is engaged with a screw shaft 23 of a motor 24. Therefore, when the screw shaft 23 is rotated by the rotation of the motor 24, the rack 12 moves along the guide shaft direction. Thus, the lens holding frame 11 is able to move along the guide shaft direction.

Figure 4:
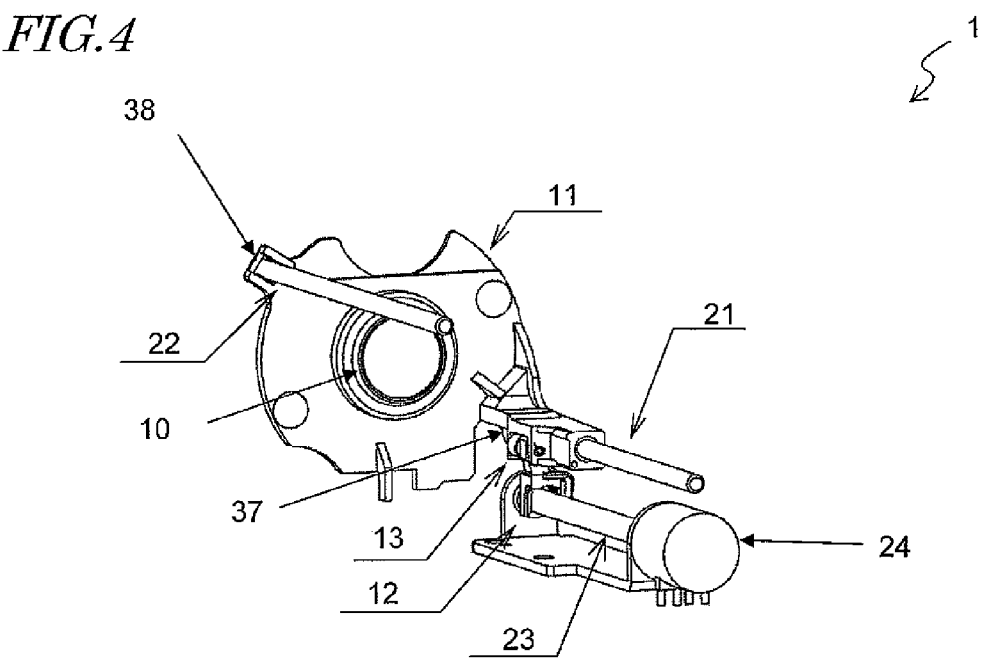
[FIG. 4] A perspective view showing a lens unit according to an embodiment of the present invention.

FIG. 2 shows the lens holding frame 11 having been moved to the left end in the figure. FIG. 3 shows the lens holding frame 11 having been moved to the right end in the figure. FIG. 4 is a perspective view of the lens unit 1.

(2. Operation)

Figure 5:
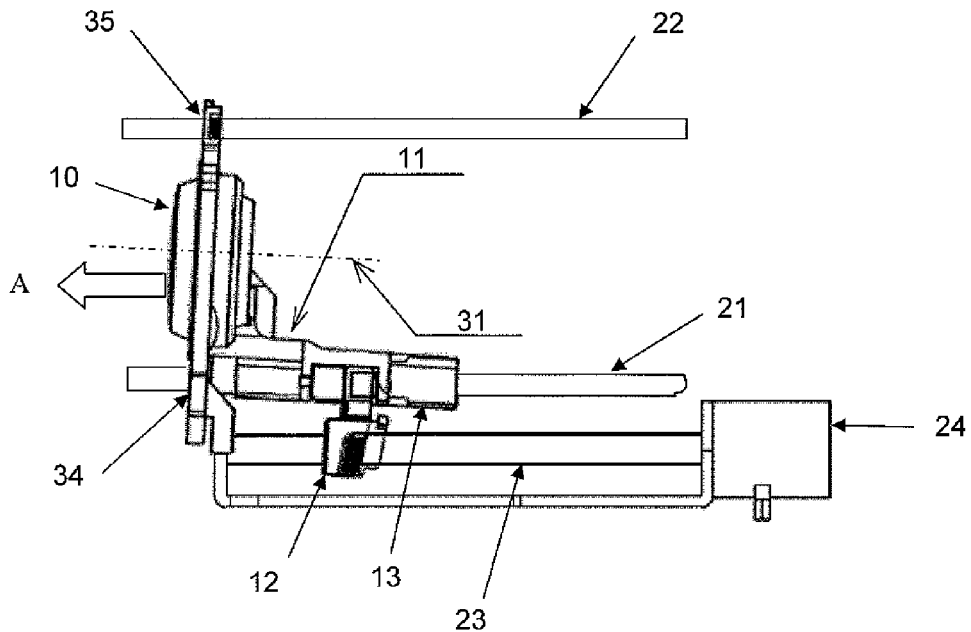
[FIG. 5] A side view showing a lens unit in a direction which is perpendicular to the optical axis.
Figure 6:
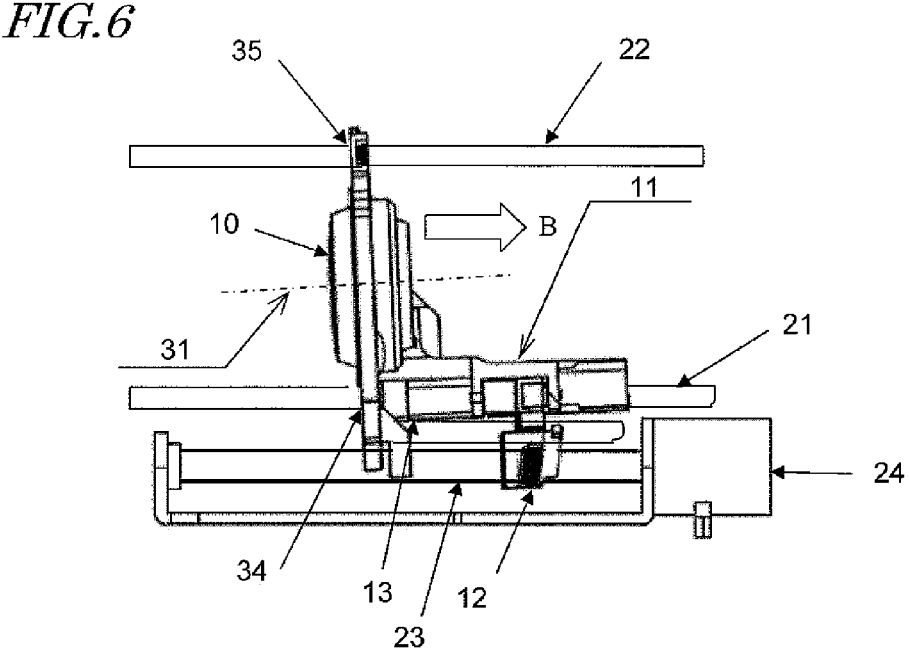
[FIG. 6] A side view showing a lens unit in a direction which is perpendicular to the optical axis.

First, the operation of the lens unit in the case where the main shaft hole 34 is circular will be described. FIG. 5 and FIG. 6 are side views showing the lens unit in a direction which is perpendicular to the optical axis.

FIG. 5 illustrates the screw shaft 23 having rotated with a forward rotation of the motor 24, thus moving the rack 12 in the direction of arrow A. While the lens holding frame 11 has moved in the direction of arrow A, an optical axis 31 of the lens 10 has rotated clockwise in the figure, although slightly. This is due to the main shaft hole 34 provided in the lens holding frame 11 being circular and having a low finishing precision.

FIG. 6 illustrates the screw shaft 23 having rotated with a reverse rotation of the motor 24, thus moving the rack 12 in the direction of arrow B. While the lens holding frame 11 has moved in the direction of arrow B, the optical axis 31 of the lens 10 has rotated counterclockwise in the figure, although slightly. This is also due to the main shaft hole 34 provided in the lens holding frame 11 being circular and having a low finishing precision.

That is, a lens unit whose main shaft hole 34 is circular has a low finishing precision due to the main shaft hole 34 being circular, thus creating play in the movement of the lens holding frame 11 along the guide shaft direction.

Figure 7:
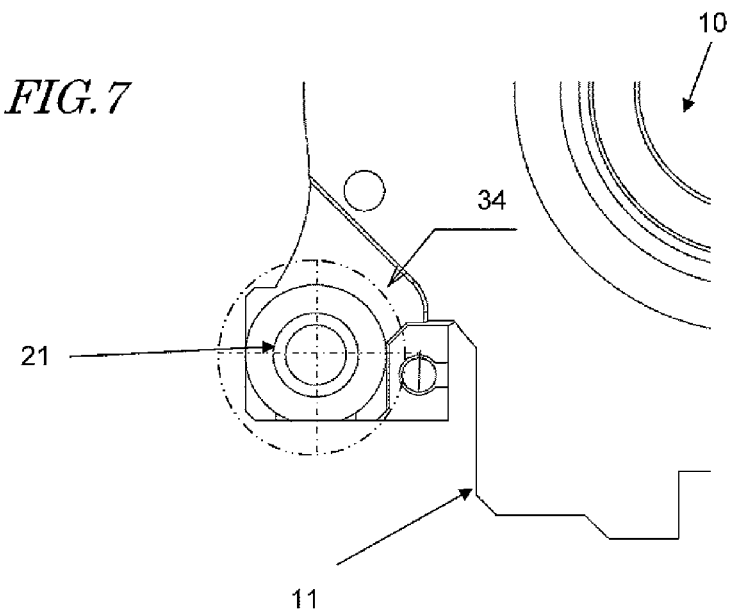
[FIG. 7] A diagram showing an enlarged view of a neighborhood of a main shaft hole which is provided in a lens holding frame.

FIG. 7 is an enlarged view of the neighborhood of the main shaft hole 34 provided in the lens holding frame 11. The main shaft hole 34 provided in the lens holding frame 11 of the lens unit is circular.

Figure 8:
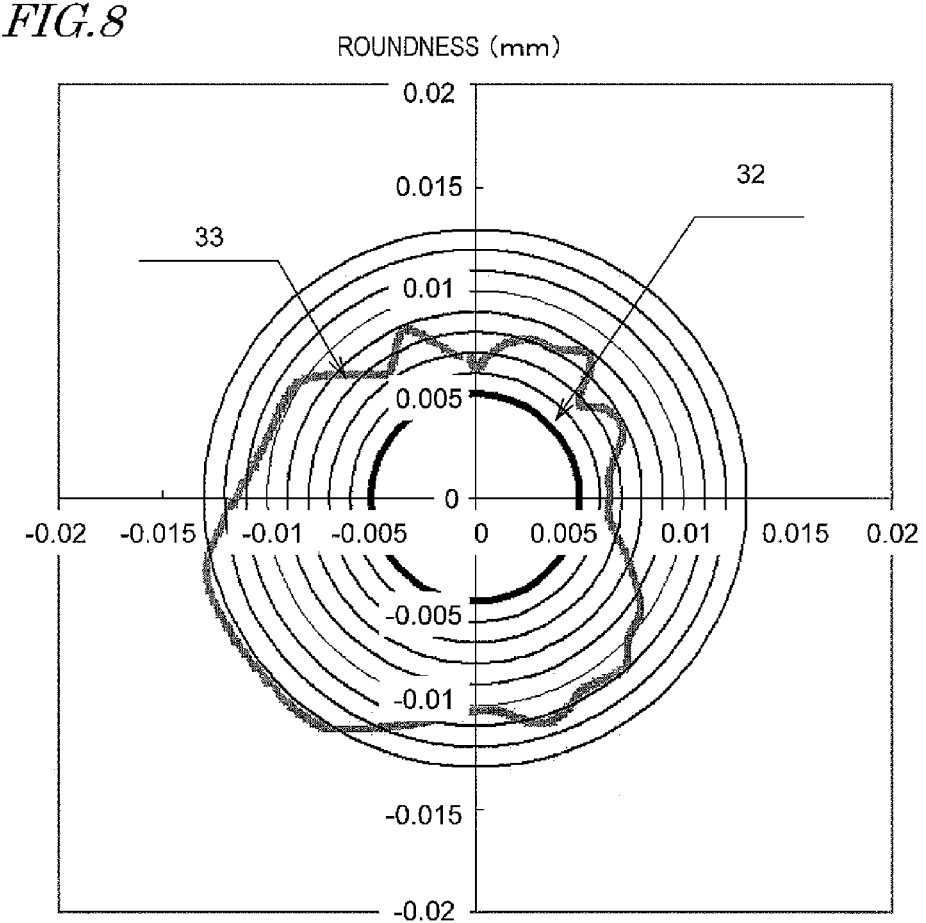
[FIG. 8] A diagram showing an exemplary finishing precision of a main shaft hole which is provided in a lens holding frame.

FIG. 8 is a diagram showing an exemplary finishing precision of the main shaft hole 34 provided in the lens holding frame 11. A perfect circle 32 represents a design target. A FIG. 33 represents the finishing precision of the main shaft hole 34 provided in the lens holding frame 11 of a lens unit which has actually been produced.

Figure 9:
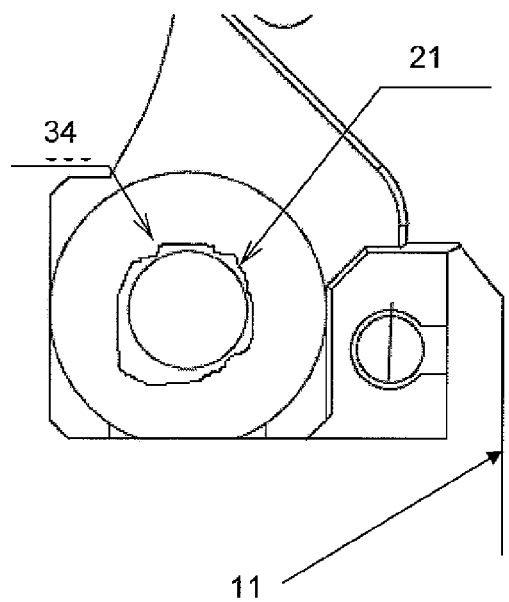
[FIG. 9] A diagram showing a lens holding frame in which a main shaft hole with the finishing precision as shown in FIG. 8 is provided.

FIG. 9 shows a portion of the lens holding frame 11 provided with the main shaft hole 34 having the finishing precision as shown in FIG. 8. In the state shown in FIG. 9, the main shaft 21 will have play in the lower left direction in the figure, with respect to the main shaft hole 34.

Thus, with the circular main shaft hole 34, a low finishing precision will result, so that the main shaft 21 will have play inside the main shaft hole 34.

Figure 10:
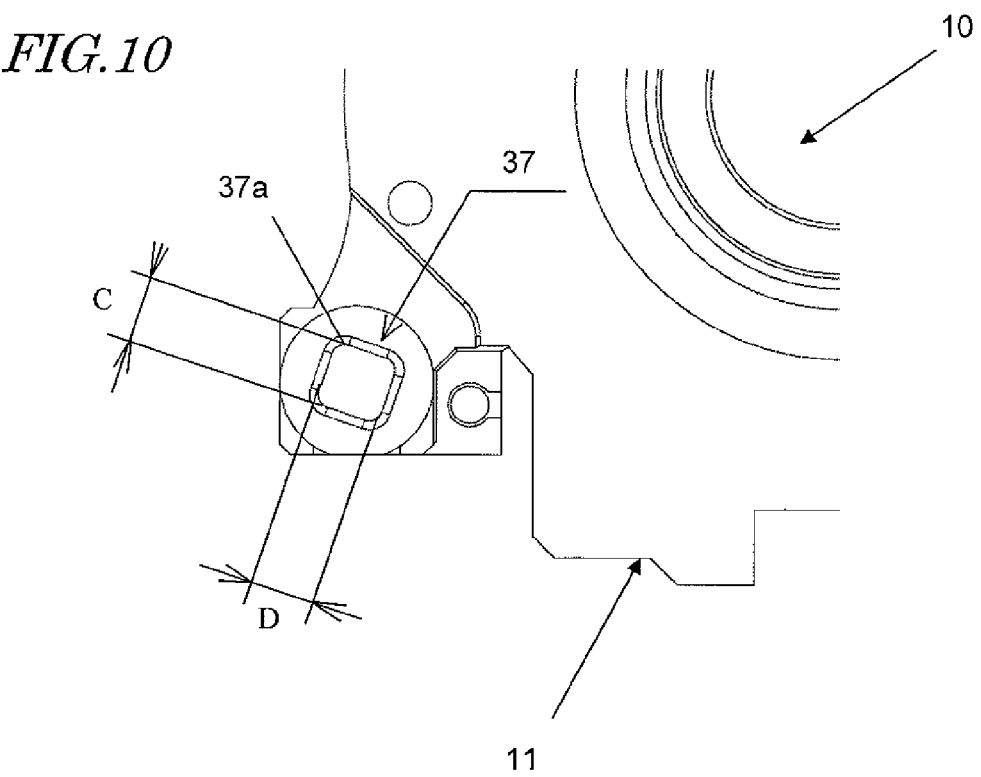
[FIG. 10] A diagram showing an enlarged view of a neighborhood of a main shaft hole which is provided in a lens holding frame according to an embodiment of the present invention.

FIG. 10 is an enlarged view of the neighborhood of a main shaft hole 37 which is provided in the lens holding frame 11 of the lens unit 1 according to Embodiment 1 of the present invention. The main shaft hole 37 which is provided in the lens holding frame 11 of the lens unit 1 according to the embodiment of the present invention is substantially rectangular. In other words, a cross-sectional shape (a shape on a plane which is orthogonal to the longitudinal direction of the main shaft) of the main shaft hole 37 is a substantial rectangle having four linear portions.

Since the main shaft hole 37 is substantially rectangular, management of finishing precision is needed only with respect to C and D in the figure. In the case where the cross-sectional shape is a square, C=D. The main shaft hole 34 provided in the lens holding frame 11 of the lens unit of FIG. 5 is circular, and therefore a considerable amount of time and a number of prototypes have been required in order to obtain a main shaft hole 34 which is close to a perfect circle. By allowing the main shaft hole 37 (FIG. 10) to be substantially rectangular, management is needed only with respect to C and D in the figure, which are the dimensions between opposite sides, whereby the number of steps in the development process can be greatly reduced. Moreover, the play in the movement of the lens holding frame 11 along the guide shaft direction, which has been described with reference to FIG. 5 and FIG. 6, can be eliminated. Note that the clearance between the main shaft hole 37 and the main shaft 21 may be designed to a value which ensures that there is no excessive sliding resistance and that the play is kept within a tolerable range.

Figure 11:
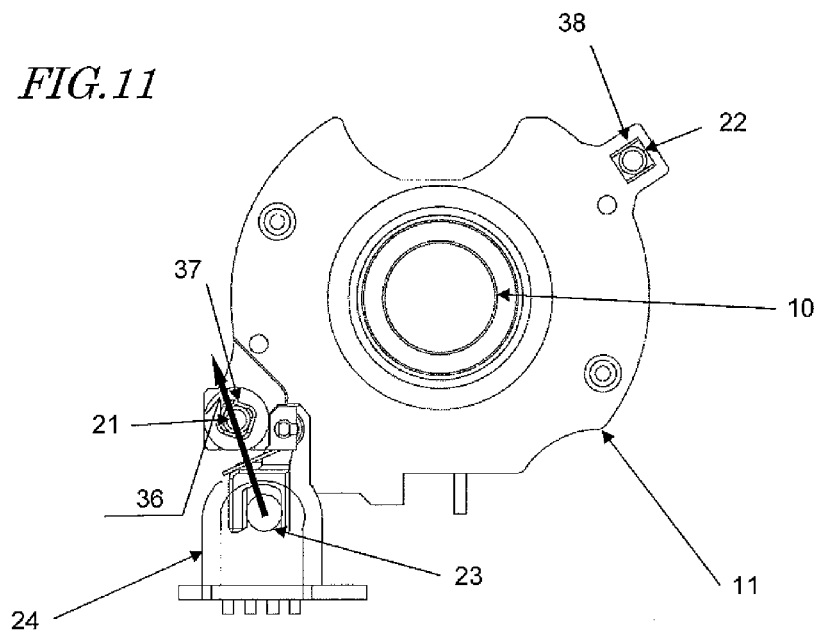
[FIG. 11] A front view of a lens unit according to an embodiment of the present invention, as viewed along the optical axis.

Next, the orientation of a corner portion 37a (FIG. 10) of the main shaft hole 37 will be described. FIG. 11 is a front view of the lens unit 1 according to Embodiment 1 of the present invention as viewed along the optical axis. When the screw shaft 23 is rotated by the rotation of the motor 24, the rack 12 moves along the guide shaft direction. In this manner, the lens holding frame 11 is able to move along the guide shaft direction. At this time, a force acts on the main shaft hole 37 in the direction shown by an arrow 36, for example. In actuality, this force is tilted toward the frontward side or the rearward side of the plane of the figure. In a plane which is perpendicular to the longitudinal direction of the main shaft 21, by orienting the corner portion 37a in the direction of the force acting from the main shaft 21 onto the main shaft hole 37, it becomes possible to support the main shaft 21 on two adjoining sides of the main shaft hole 37. In other words, the main shaft 21 is supported in contact with the two linear portions which are the sides corresponding to the corner portion 37a, which is oriented in the direction of the force acting on the main shaft hole 37. With this construction, the main shaft 21 fits against the corner portion 37a of the main shaft hole 37 so as to be in sure contact with the two linear portions, whereby the play in the movement of the lens holding frame 11 along the guide shaft direction can be further reduced. Note that the main shaft 21 may be in contact with three or more sides of the rectangle.

Note that the corner portion 37a corresponding to two linear portions (two sides) is also describable as a corner portion defined by two linear portions, or as a corner portion between two linear portions. The corner portion 37a may be rounded.

The force in the direction of the arrow 36 is an example. The direction and magnitude of the force acting on the main shaft hole 37 will differ depending on the construction for moving the lens holding frame 11 along the guide shaft direction. Consideration must also be given to the self weight of the lens holding frame 11 when an imaging apparatus incorporating the lens unit is in a usual shooting attitude. Thus, the particular orientation of the corner of the main shaft hole 37 should be based on the direction of the force acting on the main shaft hole 37; however, the specific direction must be designed while giving consideration to the construction for moving the lens holding frame 11 along the guide shaft direction and the self weight of the lens holding frame 11 when the imaging apparatus incorporating the lens unit 1 is in a usual shooting attitude.

Next, a lens unit 1 having a plurality of main shaft holes 37 will be described. The lens holding frame 11 has a guide portion 13 through which the main shaft 21 extends and on which a rack 12 is formed. Specifically, the guide portion 13 has a second main shaft hole (not shown). A cross-sectional shape of the second main shaft hole provided in the guide portion 13 is also substantially rectangular (i.e., this cross-sectional shape includes at least two linear portions). Furthermore, the orientation of the corner portions of the main shaft hole 37 provided in the lens holding frame 11 and the orientation of the corner portions of the second main shaft hole provided in the guide portion 13 are 45° apart from each other. In this manner, while supporting the main shaft 21 at four points by the main shaft hole 37 provided in the lens holding frame 11, the main shaft 21 can be supported by the second main shaft hole provided in the guide portion 13 at different four points from those of the main shaft hole 37 provided in the lens holding frame 11. In other words, the play in the movement of the lens holding frame 11 along the guide shaft direction can be suppressed in eight directions.

Note that the corner portions of the main shaft hole 37 may be curved surfaces as shown in FIG. 10. Moreover, they are chamfered at 45° toward the frontward side or the rearward side of the plane of the figure in FIG. 10. By doing so, grease is prevented from staying in the corners of the main shaft hole 37, thus allowing a necessary amount of grease to be supplied at the points of contact between the main shaft hole 37 and the main shaft 21. As for the curved surfaces of the corners of the main shaft hole 37, the size of R is to be designed in accordance with the viscosity of the grease used and the speed of movement of the lens holding frame 11.

The present embodiment illustrates that the main shaft hole 37 has a substantially rectangular cross-sectional shape. However, it may be other polygons, e.g., a triangle. If it is an octagon, for example, grease supply will become more stable.

Although not described in the present embodiment, the auxiliary shaft hole 38 is also rectangular, as shown in FIG. 1 and the like. As a result, finishing precision management becomes even more facilitated.

In a camcorder or a digital still camera incorporating the lens unit 1 of the present embodiment, the lens holding frame 11 moving along the guide shaft direction has stable behavior, thereby enabling a stable motion video shooting even when a zooming operation or an autofocus operation is performed during motion video shooting.

(Embodiment 2)

Next, as an imaging apparatus according to Embodiment 2 of the present invention, a digital still camera will be described for example. The digital still camera of the present embodiment includes a lens barrel 111 as described later. Note that the digital still camera may include the lens unit 1 of Embodiment 1 described above.

(1. Construction of the Digital Still Camera)

Figure 12:
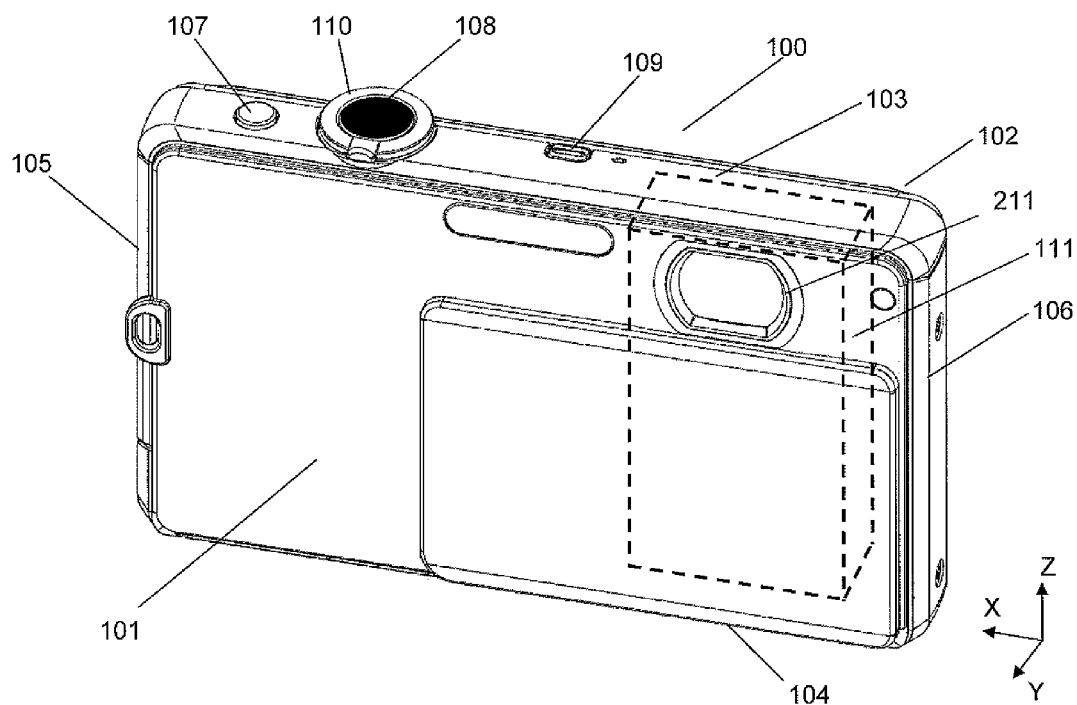
[FIG. 12] A perspective view showing the appearance of a digital still camera according to an embodiment of the present invention.

FIG. 12 is a perspective view showing the appearance of a digital still camera 100 of the present embodiment. As shown in FIG. 12, six faces composing the housing of the digital still camera 100 are defined as follows. That is, a face which is oriented toward a subject while the digital still camera 100 is used for shooting is a front face 101, and the opposite face therefrom is a rear face 102. When shooting is performed in such a manner that the top and bottom along the vertical direction of the subject coincide with the top and bottom along the shorter-side direction, as typified by aspect ratios (i.e., ratio of a longer side to a shorter side) of 3:2, 4:3, 16:9 of imaging by the digital still camera 100, a face that is oriented upward along the vertical direction is an upper face 103, and an opposite face therefrom is a bottom face 104. Furthermore, a face which appears to the subject to be on the left is a left side face 105, and an opposite face therefrom is a right side face 106. Note that the definitions of these faces also apply to the component elements as mounted in the digital still camera 100.

Moreover, as shown in FIG. 12, a three-dimensional orthogonal coordinate system having a Y axis which is orthogonal to the front face 101 of the digital still camera 100 is defined. Specifically, a direction of going from the rear face 102 toward the front face 101 is a positive direction on the Y axis; a direction of going from the right side face 106 toward the left side face 105 is an positive direction on the X axis; and a direction which is orthogonal to the X axis and the Y axis and which goes from the bottom face 104 toward the upper face 103 is a positive direction on the Z axis. Hereinafter, descriptions will be given on the basis of this XYZ coordinate system in each figure.

A first lens 211, which serves as an objective lens for a subject, is provided on the front face 101 of the digital still camera 100. On the upper face 103, a shooting mode switching button 107, a release button 108, a power switch 109, a zoom adjustment lever 110, and the like are provided for allowing a photographer to perform operations such as a shooting operation. The release button 108 is a button with which the photographer inputs a timing of exposure. The shooting mode switching button 107 is a button with which the photographer switches between settings concerning the shooting operation. The power switch 109 is a switch for allowing the photographer to turn ON or OFF the power of the digital still camera 100. The zoom adjustment lever 110 is a lever with which the photographer adjusts the zoom factor, which is constructed so as to be capable of rotating in a predetermined range of angles around the release button 108. On the rear face 102, a liquid crystal monitor (not shown) for displaying a image having been shot. Furthermore, a lens barrel 111, in which lens groups for forming an optical image of the subject are accommodated, is provided inside the digital still camera 100.

(2. Construction of the Lens Barrel)

Figure 13:
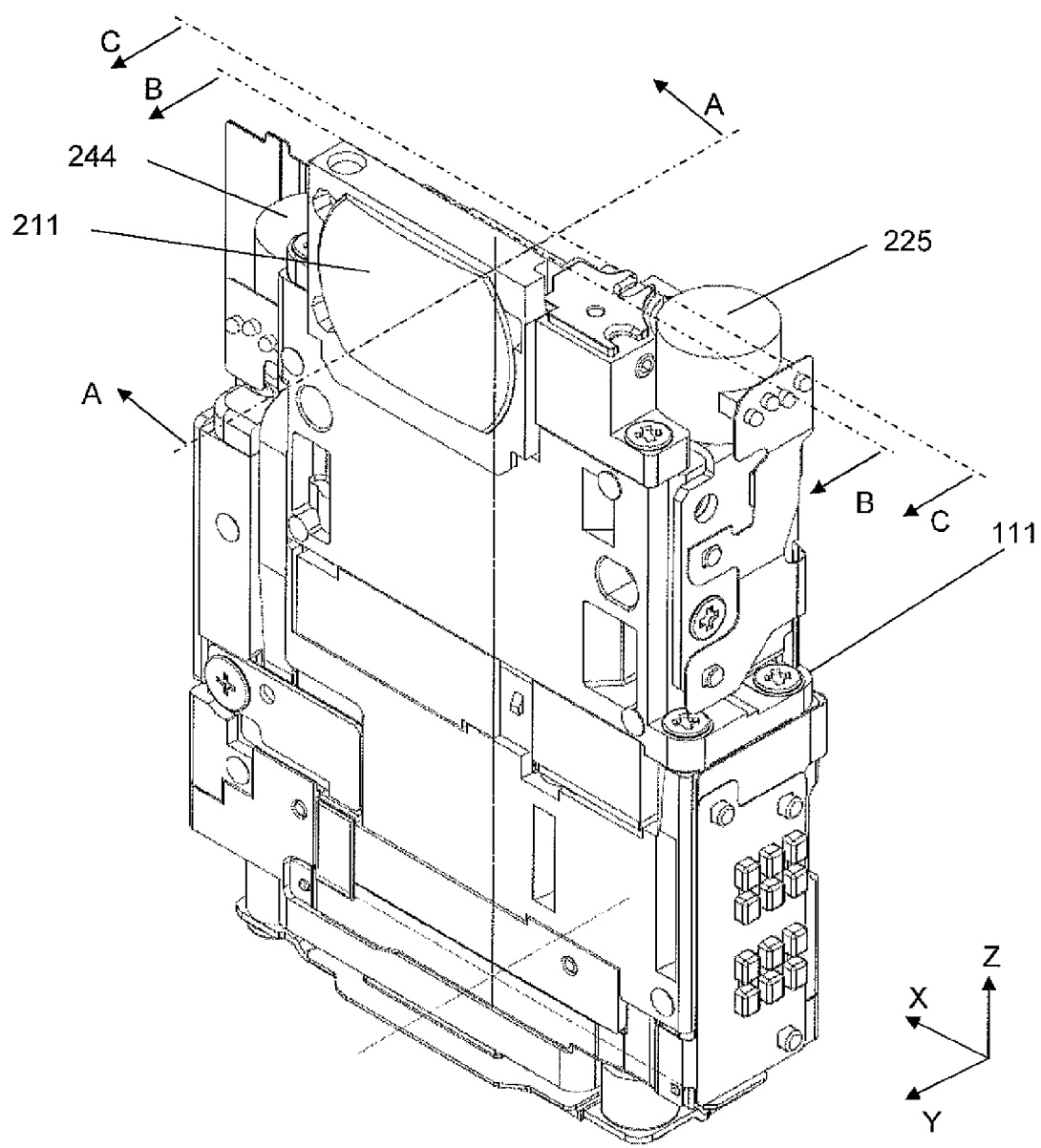
[FIG. 13] A perspective view showing the appearance of a lens barrel which is accommodated inside a digital still camera according to an embodiment of the present invention.
Figure 14:
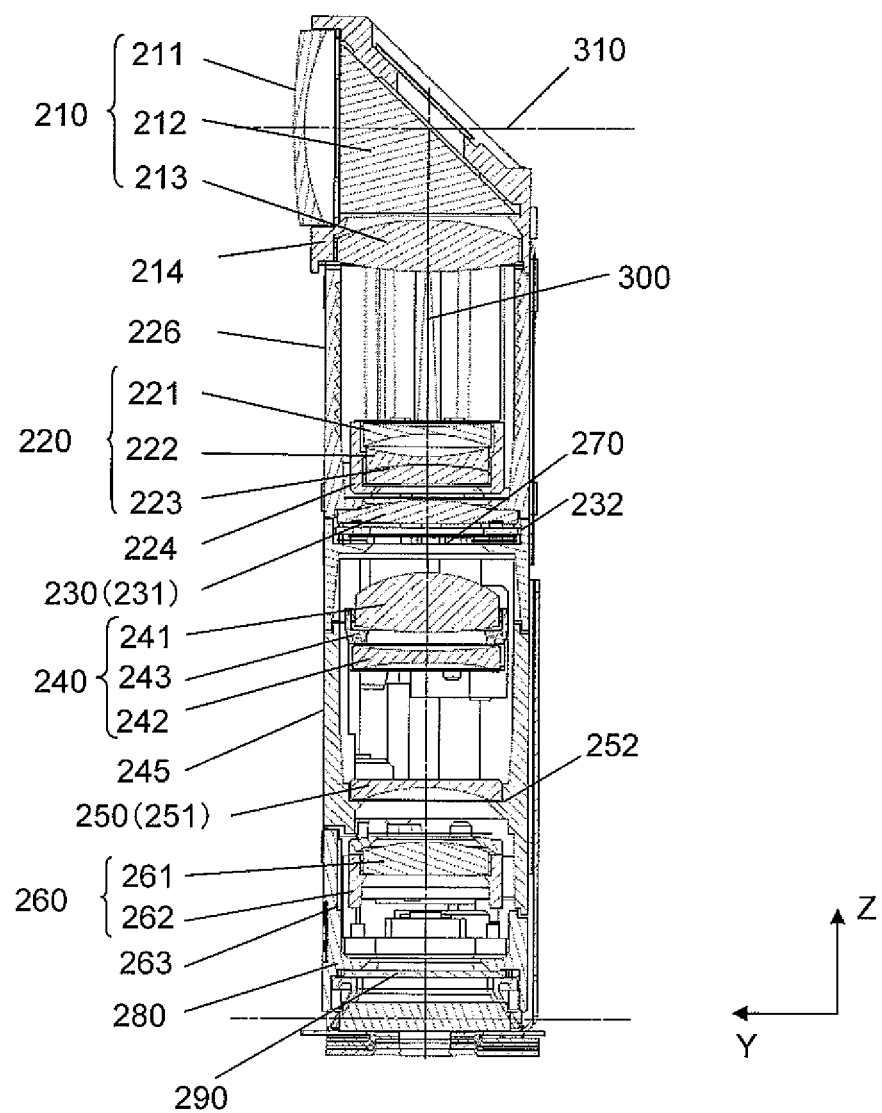
[FIG. 14] A cross-sectional view of a lens barrel according to an embodiment of the present invention, corresponding to line A-A in FIG. 13.

FIG. 13 is a perspective view showing an appearance of the lens barrel 111 accommodated inside the digital still camera 100. FIG. 14 is a cross-sectional view along line A-A in FIG. 13.

As shown in FIG. 13 and FIG. 14, in the lens barrel 111, a first lens group 210, a second lens group 220, a third lens group 230, a fourth lens group 240, a fifth lens group 250, and a sixth lens group 260 are disposed. Furthermore, a shutter unit 270 is disposed between the third lens group 230 and the fourth lens group 240. The sixth lens group 260 is supported on a master flange 280, and an imaging device 290 is disposed on the master flange 280. As the imaging device 290, for example, a CCD (Charge Coupled Device), a CMOS (Complementary Metal-oxide Semiconductor) sensor, or the like is used.

The first lens group 210 is composed of the first lens 211 serving as an objective lens, a reflection prism 212 as a second lens, and a third lens 213, which are securely adhered and fixed to a housing 214 composing the lens barrel 111.

The second lens group 220 is a zoom lens group, in which a fourth lens 221, a fifth lens 222, and a sixth lens 223 are securely adhered and mounted to a second lens group holding frame 224. By the action of a second lens group driving means 225 (FIG. 15) provided outside the lens barrel 111, the second lens group holding frame 224 moves within a housing 226 of the lens barrel 111 (FIG. 14). The third lens group 230 is composed of a single seventh lens 231, which is securely supported by a housing 232.

The fourth lens group 240 is a focusing lens group, which is composed of an eighth lens 241 and a ninth lens 242, and mounted to a fourth lens group holding frame 243. By the action of a fourth lens group driving means 244 (FIG. 13) provided outside the lens barrel 111, the fourth lens group holding frame 243 moves within a housing 245 of the lens barrel 111.

The fifth lens group 250 is composed of a single tenth lens 251, and securely supported by a housing 252.

The sixth lens group 260 is a handshake correction lens group which includes an eleventh lens 261, the eleventh lens 261 being mounted to a sixth lens group holding frame 262. By the action of a sixth lens group driving means (not shown), the sixth lens group holding frame 262 moves within a housing 263 of the lens barrel 111.

The respective housing 214, housing 226, housing 232, housing 245, housing 252, housing 263, and master flange 280 composing the lens barrel 111 are assembled so as to be parallel to an optical axis 300 along the Z axis direction as shown in FIG. 14. Note that these housings may be formed integrally. Moreover, an optical axis 310 shown in FIG. 14 is an optical axis along the Y axis direction, as incident from the first lens 211 serving as an objective lens, such that the optical axis 310 and the optical axis 300 intersect each other at right angles on the same plane.

Therefore, light entering through the first lens 211 travels through the first lens group 210, the second lens group 220, the third lens group 230, the shutter unit 270, the fourth lens group 240, the fifth lens group 250, and the sixth lens group 260, and converges on the imaging device 290. At this time, the second lens group 220 moves along the optical axis 300 for making zoom adjustments. The fourth lens group 240 moves along the optical axis 300 for making focus adjustments. The sixth lens group 260 moves along the optical axis 300 for making adjustments as to handshake correction.

(3. Construction of the Moving Mechanism for the Second Lens Group 220)

As shown in FIG. 14, the second lens group 220 is securely supported by the second lens group holding frame 224, and is covered by a light shielding sheet (not shown) which is intended for blocking unwanted light. On the second lens group holding frame 224, a second lens group move bearing section 420 (FIG. 15) and a zooming rack section 430 (FIG. 16) are integrally formed. A columnar guide shaft 440 is inserted in the second lens group move bearing section 420. Via a first bearing 420a and a second bearing 420b provided in an upper portion and a lower portion along the longitudinal direction thereof, the second lens group move bearing section 420 is axially supported by the guide shaft 440, so as to be capable of sliding along the guide shaft 440.

In other words, a guide hole of the first bearing 420a and a guide hole of the second bearing 420b through which the guide shaft 440 penetrates are placed along the longitudinal direction of the guide shaft 440. Then, by the second lens group driving means 225, e.g., a stepping motor, a lead screw 500 engaging with the zooming rack section 430 (FIG. 16) is driven, whereby the zooming rack section 430 moves up or down along the Z axis direction. With this movement, the second lens group holding frame 224 moves up or down in the Z axis direction along the optical axis 300, while its position is restricted by the guide shaft 440 (FIG. 15), whereby zoom adjustments can be made.

On a side face of the second lens group holding frame 224 opposite from the second lens group move bearing section 420 (FIG. 15), a third bearing 450 is provided. A zoom guide sub-shaft 460 (FIG. 15) which stands upright integrally from the housing 232 of the third lens group 230 (FIG. 14) penetrates through a guide hole of the third bearing 450. The third bearing 450 of the second lens group holding frame 224 moves up or down along the zoom guide sub-shaft 460.

Figure 17:
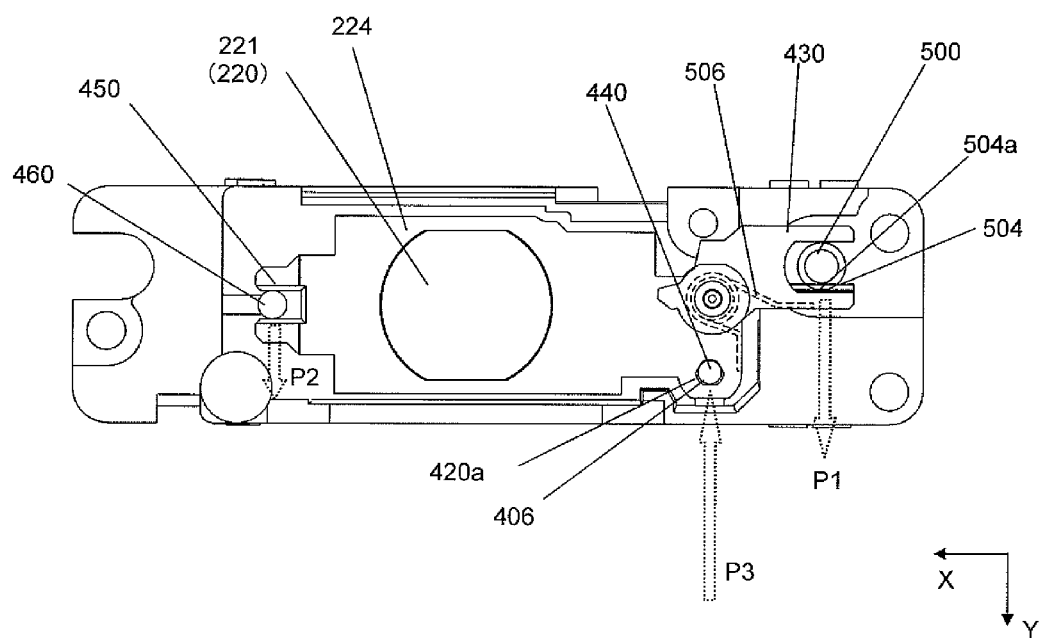
[FIG. 17] A plan view showing the construction of a lens holding frame according to an embodiment of the present invention.

FIG. 17 is a plan view showing the construction of the second lens group 220 of the present embodiment and the neighborhood thereof.

In the second lens group holding frame 224, a rack gear 504 is provided which is moved along the longitudinal direction of the guide shaft 440 (main shaft) with the rotation of the lead screw 500. Also provided in the second lens group holding frame 224 is a rack spring 506 which energizes the rack gear 504 against the lead screw 500.

As shown in FIG. 17, in a cross section which is orthogonal to the longitudinal direction of the guide shaft 440 (main shaft), a point of abutment 504a between the rack gear 504 and the lead screw 500, the guide shaft 440, and the sub-shaft 460 are located in this order. More specifically, in a direction (X axis direction) which is orthogonal to the direction (Y axis direction) of a force occurring between the rack gear 504 and the lead screw 500 due to the rack spring 506 and which is orthogonal to the longitudinal direction (Z axis direction) of the guide shaft 440, the point of abutment 504a between the rack gear 504 and the lead screw 500, the guide shaft 440, and the sub-shaft 460 are located in this order.

As shown in FIG. 17, the zooming rack section 430 is pressed by the rack spring 506 against the lead screw 500, so that the zooming rack section 430 and the lead screw 500 are meshed. Specifically, the rack gear 504 meshes with the ridges of the lead screw 500. Herein, owing to the torque of the rack spring 506, the portion of the zooming rack section 430 meshing with the lead screw 500 experiences a reaction force P1 in the positive direction on the Y axis. Moreover, the third bearing 450 experiences a reaction force P2 also in the positive direction on the Y axis. The first bearing 420a and the second bearing 420b (FIG. 15) experience a reaction force P3 (FIG. 17) in the negative direction on the Y axis, which balances out with the reaction forces P1 and P2.

Figure 18:
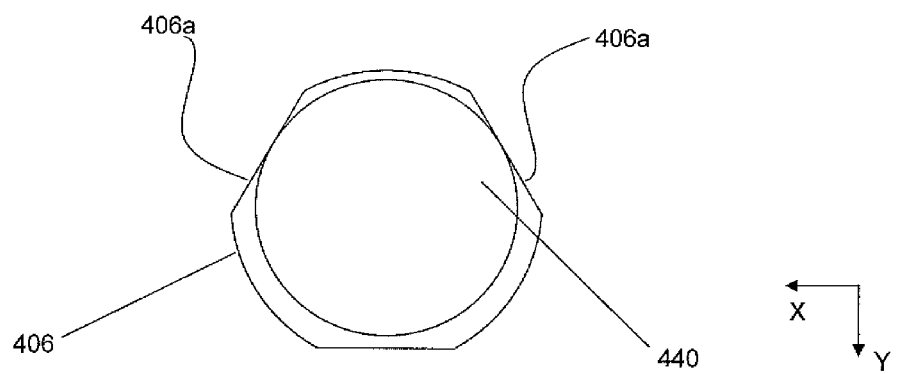
[FIG. 18] A plan view showing a guide hole in a lens holding frame according to an embodiment of the present invention.

As shown in FIG. 17 and FIG. 18, a cross section of the guide hole 406 of the first bearing 420a which is taken orthogonal to the longitudinal direction of the guide shaft 440 (i.e., the direction along the optical axis 300) includes at least two linear portions 406a, such that the guide shaft 440 is in contact with two of such linear portions 406a. This is because, as described earlier, the first bearing 420a experiences the reaction force P3 in the negative direction on the Y axis due to the torque of the rack spring 506. Thus, the two linear portions are at positions on the guide hole 406 of the first bearing 420a which receive reaction forces occurring in the second lens group holding frame 224 as the rack spring 506 energizes the rack gear 504 against the lead screw 500. By the forces occurring in the second lens group holding frame 224 in the positive direction on the Y axis (reaction forces P1 and P2), the two linear portions 406a are energized against the guide shaft 440. A corner portion of the guide hole at which the two linear portions (or extensions thereof) intersect (corresponding to the corner portion 37a in FIG. 10) is oriented in the direction of the force which the rack gear 504 applies to the lead screw 500 (the negative direction on the Y axis). With this construction, the play of the second lens group holding frame 224 can be reduced.

In the present specification, "a guide shaft being in contact with two linear portions" is not limited to being in contact with only the two linear portions, but also means being in contact with at least two linear portions. In other words, the guide shaft may be in contact with two or more linear portions 406a.

Figure 15:
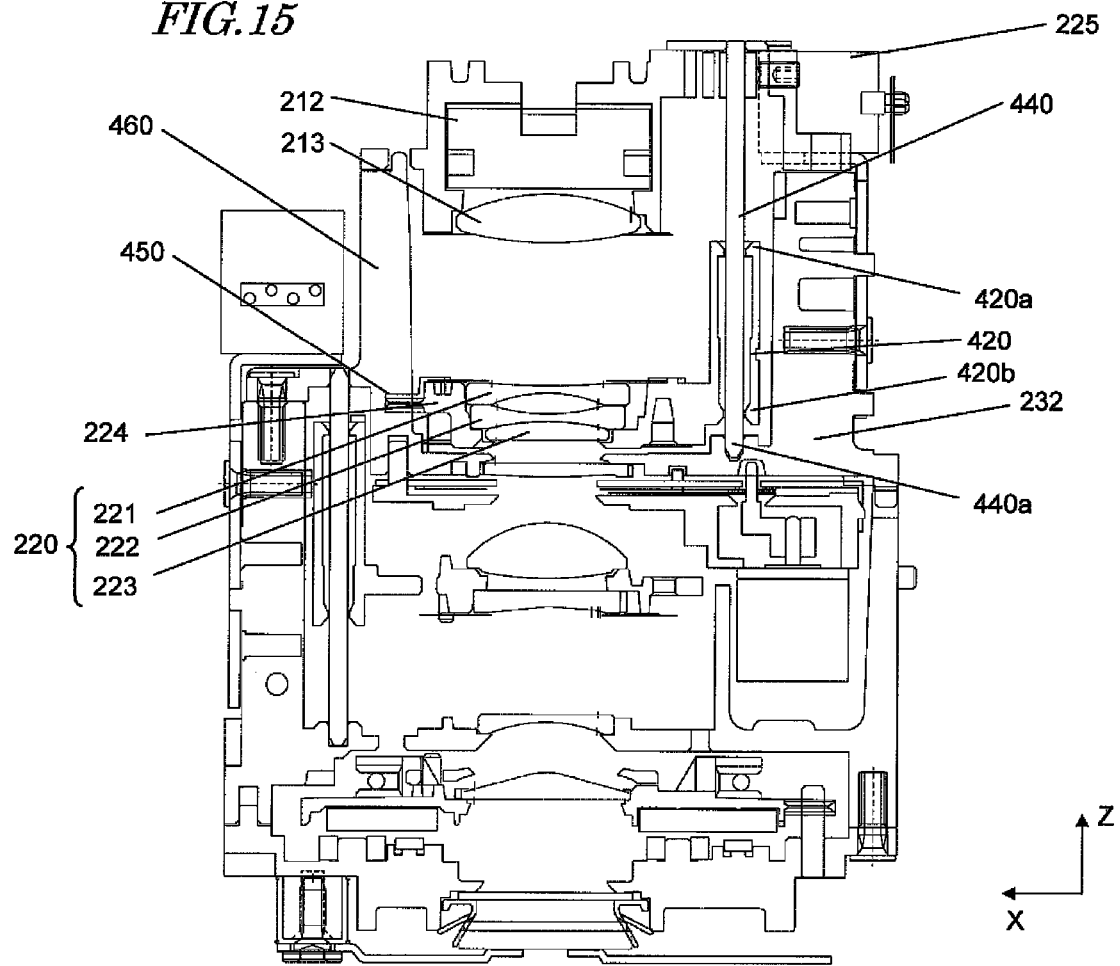
[FIG. 15] A cross-sectional view of a lens barrel according to an embodiment of the present invention, corresponding to line B-B in FIG. 13.
Figure 16:
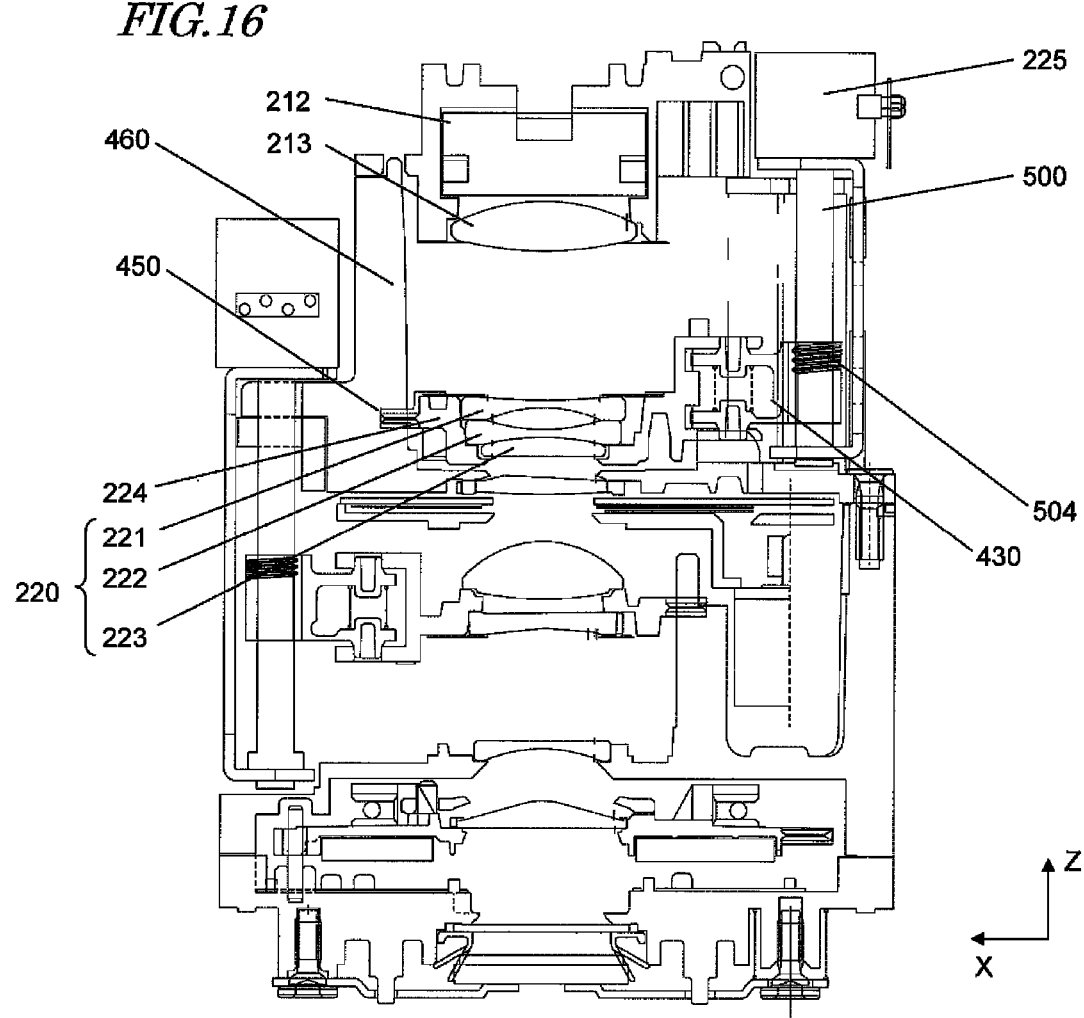
[FIG. 16] A cross-sectional view of a lens barrel according an embodiment of the present invention, corresponding to line C-C in FIG. 13.

A guide hole 406 similar to that of the first bearing 420a may also be provided in the second bearing 420b (FIG. 15). In this case, similarly to the guide hole 406 of the first bearing 420a, a cross section of the guide hole 406 of the second bearing 420b as taken orthogonal to the optical axis 300 includes at least two linear portions, such that the guide shaft 440 is in contact with two such linear portions 406a. With this construction, balancing of forces between the second lens group holding frame 224 and the guide shaft 440 becomes even more stable, whereby the play of the second lens group holding frame 224 can be further reduced.

Moreover, as shown in FIG. 15, an end 440a of the guide shaft 440 is securely supported by the housing 232 of the third lens group 230. Another end (not shown) of the guide shaft 440 penetrates through the housing 214 (FIG. 14), to which the first lens group 210 is fixed, and is securely supported by a retention member (not shown) provided in an upper portion of the housing 214. In other words, the second lens group 220, serving as zoom lenses, moves along the guide shaft 440 being securely supported by the housing 232 of the third lens group 230 and the housing 214 of the first lens group 210, which compose the lens barrel 111.

(4. Construction of the Zooming Rack Section 430)

Figure 19:
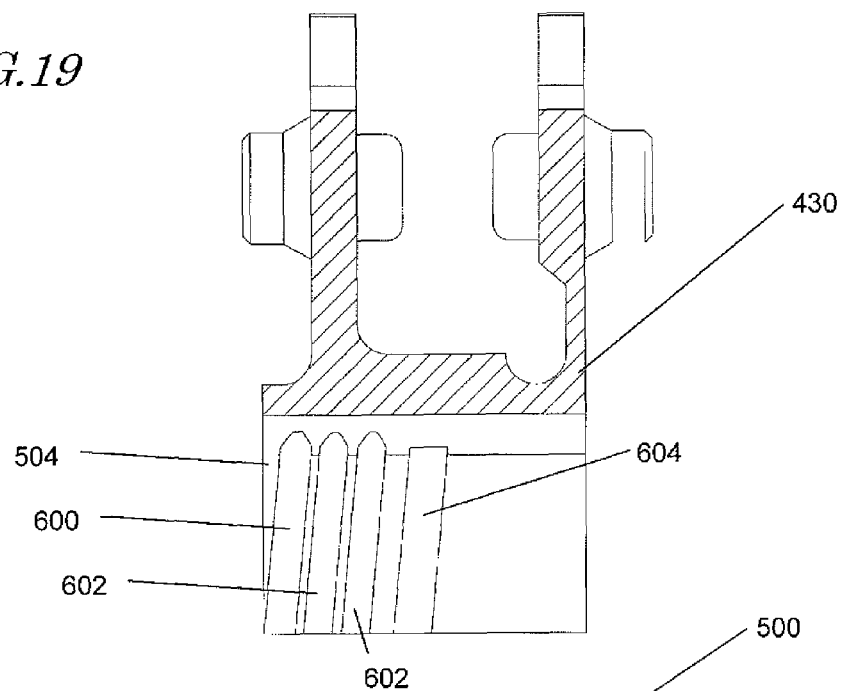
[FIGS. 19] (a) and (b) are diagrams showing how a rack gear and a lead screw according to an embodiment of the present invention are meshed.
Figure 20:
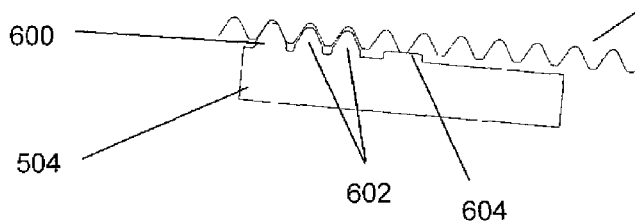
[FIG. 20] An enlarged view of the main portions, showing how a rack gear and a lead screw according to an embodiment of the present invention are meshed.
Figure 20:
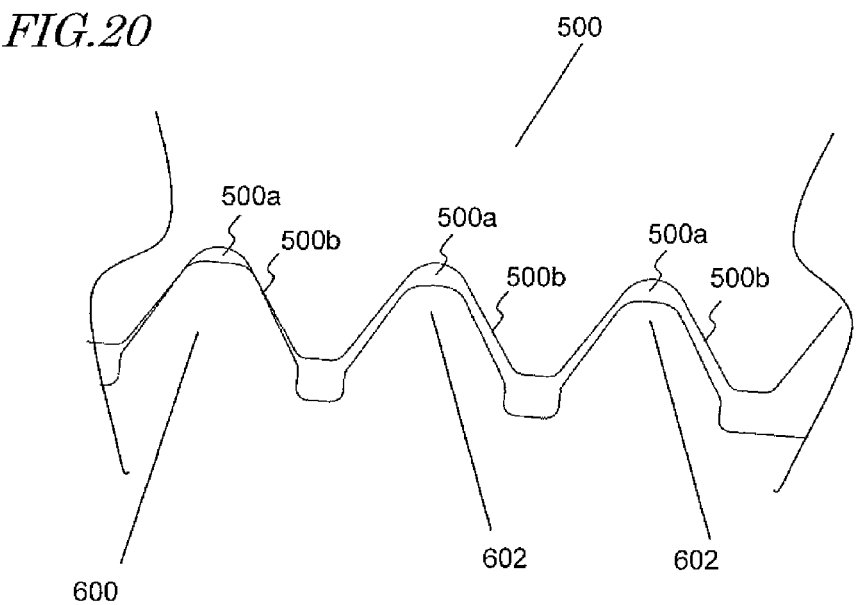

Next, the construction of the zooming rack section 430 will be described more specifically. FIG. 19(a) is a diagram showing the zooming rack section 430 having the rack gear 504, and FIG. 19(b) is a diagram showing how the rack gear 504 and the lead screw 500 are meshed. FIG. 20 is an enlarged view of the portion where the rack gear 504 and the lead screw 500 are meshed. As shown in FIG. 19 and FIG. 20, the zooming rack section 430 includes the rack gear 504, on which a plurality of teeth are formed. The rack gear 504 has a first tooth 600 which abuts with a shoulder portion 500b of a groove 500a of the lead screw 500. Moreover, the rack gear 504 has second teeth 602 adjoining the first tooth 600 and being disposed at an interval which is the groove pitch of the lead screw 500, such that the second teeth 602 do not abut with the groove 500a. That is, the first tooth 600 and the second teeth 602 are similar figures, such that the second teeth 602 are smaller. The rack gear 504 further has a flat abutting portion 604 which abuts with the crest of at least one ridge of the lead screw. When the longitudinal direction (Z axis direction) of the guide shaft 440 (main shaft) is defined as the height direction, the first tooth 600 is located at a height corresponding to a substantial center between the guide hole of the first bearing 420a and the guide hole of the second bearing 420b. Moreover, the second teeth 602 are located closer to an end than the substantial center at which the first tooth 600 is located.

With this construction, during normal use, the rack gear 504 is loaded with the lead screw 500 only via the first tooth 600, so that the loading point becomes stable. Moreover, in emergencies such as falling, even if the rack gear 504 slips due to an impact force of falling, the second teeth 602 will mesh with the lead screw 500, whereby the moving operation of the lens holding frame will be maintained.

Furthermore, the loading point of the rack gear 504 will become even more stable owing to the abutting portion 604.

Thus, as has been described above, the lens barrel 111 according to the embodiment of the present invention includes the second lens group 220 moving in directions along the optical axis 300, a second lens group holding frame 224 holding the second lens group 220, and the lead screw 500 disposed along the optical axis 300. Moreover, the lens barrel 111 includes: the rack gear 504, which is fixed to the second lens group holding frame 224 and which is moved in directions along the optical axis 300 due to rotation of the lead screw 500; the rack spring 506 for energizing the rack gear 504 against the lead screw 500; and the columnar guide shaft 440 being disposed along the optical axis 300 and penetrating through the guide hole 406 provided in the second lens group holding frame 224. A cross section of the guide hole 406 taken orthogonal to the optical axis 300 includes at least two linear portions 406a. The guide shaft 440 is in contact with the at least two linear portions 406a.

With this construction, balancing of forces between the second lens group holding frame 224 and the guide shaft 440 becomes stable, whereby the play of the second lens group holding frame 224 can be reduced. Thus, there is provided a lens barrel that makes it possible to reduce the play of the second lens group holding frame 224, which is capable of moving in directions along the optical axis 300 while being guided by the guide shaft 440.

The rack gear 504 according to the embodiment of the present invention has the first tooth 602 abutting with the groove 500a of the lead screw 500, and the second teeth 602 adjoining the first tooth 602 and being disposed at an interval which is the groove pitch of the lead screw 500, such that the second teeth 602 do not abut with the groove 500a of the lead screw 500.

With this construction, during normal use, the rack gear 504 is loaded with the lead screw 500 only via the first tooth 600, so that the loading point becomes stable. Moreover, in emergencies such as falling, even if the rack gear 504 slips due to an impact force of falling, the second teeth 602 will mesh with the lead screw 500, whereby the moving operation of the second lens group holding frame 224 will be maintained.

In the descriptions of the embodiments of the present invention, examples where the present invention is applied to the second lens group 220 having a zooming function have been illustrated. However, the present invention is not limited thereto. For example, the present invention is also applicable to the fourth lens group 240 having a focusing function. Moreover, the present invention is applicable also to straight optics, instead of the bent optics in the embodiments of the present invention.

Thus, embodiments of the present invention have been described by way of examples. However, the present invention is not limited thereto, and is also applicable to other somewhat modified embodiments.

Industrial Applicability

According to the present invention, it is possible to reduce deteriorations in the optical performance by decreasing the play of a lens holding frame which is guided by a guide shaft so as to be capable of moving along an optical axis direction. Therefore, the present invention is widely useful as a lens barrel for portable devices such as exchangeable lens type DSCs (Digital Still Cameras) and fixed-lens type DSCs, camcorders, and the like, or as a lens barrel for television cameras, monitor cameras, and the like, for example.

REFERENCE SIGNS LIST

1 lens unit
10 lens
11 lens holding frame
12 rack
13 guide portion
21 main shaft
22 auxiliary shaft
23 screw shaft
24 motor
31 optical axis
37 main shaft hole
38 auxiliary shaft hole
100 digital still camera
101 front face
102 rear face
103 upper face
104 bottom face
105 left side face
106 right side face
107 shooting mode switching button
108 release button
109 power switch
110 zoom adjustment lever
111 lens barrel
210 first lens group
211 first lens
212 reflection prism
213 third lens
214, 226, 232, 245, 252, 263 housing
220 second lens group
221 fourth lens
222 fifth lens
223 sixth lens
224 second lens group holding frame
225 second lens group driving means
230 third lens group
231 seventh lens
240 fourth lens group
241 eighth lens
242 ninth lens
243 fourth lens group holding frame
244 fourth lens group move bearing section
244a first bearing
244b second bearing
244c third bearing
250 fifth lens group
251 tenth lens
260 sixth lens group
261 eleventh lens
262 sixth lens group holding frame
270 shutter unit
280 master flange
290 imaging device
300, 310 optical axis
406 guide hole
406a linear portion
420 second lens group move bearing section
420a first bearing
420b second bearing
430 zooming rack section
440 guide shaft
440a, 440b end
450 third bearing
500 lead screw
500a groove 500b shoulder portion
504 rack gear
506 rack spring
600 first tooth
602 second tooth
604 abutting portion

The invention claimed is:

1. A lens barrel comprising:
a lens holding frame holding a lens group; and
a rack gear provided in the lens holding frame for being moved along a longitudinal direction of a main shaft by a rotation of a lead screw, wherein,
the rack gear includes:
a first tooth abutting with a groove of the lead screw,
a second tooth adjoining the first tooth and being disposed at an interval which is a groove pitch of the lead screw, such that the second tooth does not abut with the groove of the lead screw, and
a flat abutting portion abutting with a crest of at least one ridge of the lead screw.

2. The lens barrel of claim 1, wherein, along the longitudinal direction of the main shaft, the first tooth, the second tooth, and the abutting portion are disposed in this order.

3. The lens barrel of claim 1, wherein the rack gear includes only one said first tooth.

4. The lens barrel of claim 1, wherein,
a plurality of guide holes are formed in the lens holding frame;
where the longitudinal direction of the main shaft defines a height direction, the first tooth is located at a height corresponding to a substantial center between a first guide hole and a second guide hole among the plurality of guide holes; and
the second tooth is located closer to an end than is the first tooth.

5. The lens barrel of claim 1, wherein,
a guide hole is provided in the lens holding frame, the guide hole being penetrated by the main shaft; and
a first guide hole is formed in the lens holding frame, the first guide hole being penetrated by a sub-shaft; and
in a cross section taken orthogonal to the longitudinal direction of the main shaft, a point of abutment between the rack gear and the lead screw, the main shaft, and the sub-shaft are disposed in this order.

6. The lens barrel of claim 5, further comprising
a rack spring provided on the lens holding frame for energizing the rack gear against the lead screw, wherein
along a direction which is orthogonal to a direction of a force generated by the rack spring between the rack gear and the lead screw and which is orthogonal to the longitudinal direction of the main shaft, the point of abutment between the rack gear and the lead screw, the main shaft, and the sub-shaft are disposed in this order.

7. The lens barrel of claim 1, wherein,
the main shaft has a circular cross section;
a cross section of the guide hole taken orthogonal to the longitudinal direction of the main shaft includes at least two linear portions; and
the main shaft is in contact with the two linear portions.

8. The lens barrel of claim 7, wherein,
a plurality of said guide holes are formed in the lens holding frame;
each of the plurality of guide holes includes at least two linear portions;
the two linear portions of each of the plurality of guide holes are in contact with the main shaft;
each of the plurality of guide holes includes a corner portion corresponding to the two linear portions; and
the respective corner portions of the plurality of guide holes are oriented in mutually different directions.

9. The lens barrel of claim 7, wherein a corner portion of the guide hole corresponding to the two linear portions is oriented in a direction of a force acting on the guide hole.

10. The lens barrel of claim 9, wherein,
two guide holes are formed in the lens holding frame; and
the respective corner portions of the two guide holes are oriented in directions which are 45° apart.

11. The lens barrel of claim 7, wherein the cross section of the guide hole is a triangle or a rectangle.

12. The lens barrel of claim 6, wherein two linear portions are provided at positions of the plurality of guide holes which receive reaction forces occurring in the lens holding frame when the rack spring energizes the rack gear against the lead screw.

13. The lens barrel of claim 12, wherein the two linear portions are energized against the main shaft due to the reaction forces.

14. The lens barrel of claim 9, wherein,
each of the plurality of guide holes includes a corner portion corresponding to the two linear portions; and
the corner portion of each of first and second guide holes is oriented in a direction of a force which the rack gear applies to the lead screw.

15. An imaging apparatus comprising the lens barrel of claim 1.

* * * * *